INVENTORS:
ROBERT C. DE VRIES;
JAMES F. FLEISCHER, by

THEIR ATTORNEY 3,701,826
CUBIC BORON NITRIDE PREPARATION FROM
LITHIUM-BORON-NITROGEN MIXTURES
Robert C. De Vries, Burnt Hills, and James F. Fleischer, Scotia, N.Y., assignors to General Electric Company
Filed Jan. 28, 1971, Ser. No. 110,513
Int. Cl. C01b *21/06*
U.S. Cl. 423—290       7 Claims

ABSTRACT OF THE DISCLOSURE

The presence of oxygen has been found to be necessary during the reaction to produce cubic boron nitride crystals in the lithium-boron-nitrogen system when a lithium-rich system is employed particularly if much of the lithium is present as $Li_3BN_2$. The preferred mechanism is to provide the oxygen in the reaction mixture in the desired concentration by the addition of (a) $B_2O_3$ or (b) a boron source plus at least one decomposable metal oxide.

BACKGROUND OF THE INVENTION

The preparation of cubic boron nitride is disclosed in U.S. Patent No. 2,947,617—Wentorf, Jr., which patent describes the starting reaction mixture as containing a source of boron, a source of nitrogen, and a source of catalyst metal, the catalyst metal being selected from the class consisting of alkali metals, alkaline earth metals, tin, lead, and antimony.

SUMMARY OF THE INVENTION

This invention is based upon the discovery that in the preparation of cubic boron nitride from lithium-rich (greater than about 30 atom percent lithium as defined in terms of the Li—B—N system), and particularly if much of the lithium is present as $Li_3BN_2$, oxygen must be present in the reaction zone in order to produce cubic boron nitride crystals. Preferably, the oxygen content is controlled by the addition of preselected amounts of material selected from the group consisting of (a) boron oxide and (b) boron metal (or other boron source) plus a decomposable metal oxide.

BRIEF DESCRIPTION OF THE DRAWING

The exact nature of this invention as well as objects and advantages thereof will be readily apparent from consideration of the following specification relating to the annexed drawing wherein.

DESCRIPTION OF THE PREFERRED EMBODIMENT

Figure 1:
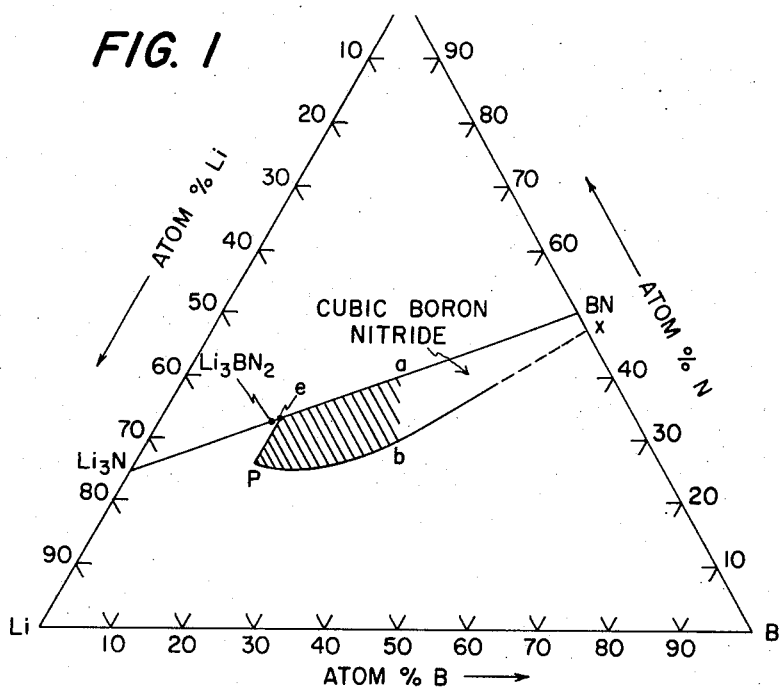
FIG. 1 represents the phase diagram for the Li—B—N system having superimposed thereon the cubic boron nitride stability region at a pressure of 55 kilobars for composition at least as rich in lithium and boron as the series of composition defined by the $Li_3N$—BN operating line and FIG. 2 illustrates the three-dimensional cubic boron nitride stability zone provided by the addition of oxygen to compositions in the cubic boron nitride stability region of FIG. 1.

The cubic boron nitride stability region represented in FIG. 1 is the area defined by *e*, BN, X, P, *e* at a pressure of 55 kb. At higher pressures the area of this region will be slightly larger than shown and at lower pressures the area of this region of stability will be slightly smaller than shown. The requisite pressures, temperatures and apparatus for the production of cubic boron nitride are defined in the aforementioned Wentorf patent, incorporated by reference.

It has been found that when lithium-rich compositions of the lithium/boron/nitrogen system (compositions falling approximately within the shaded area *a, b,* P, *e, a*), and particularly when the major portion of the lithium is present in the compound $Li_3BN_2$, oxygen is a necessary ingredient for the production of cubic boron nitride. Although the theory is not well defined it appears that the role of oxygen in lithium-rich mixtures is one of reaction with lithium and boron to produce a lithium borate melt with which cubic boron nitride will coexit.

This teaching is not in conflict with the teachings in the Wentorf patent, because when the reaction vessel construction taught therein is employed for the preparation of cubic boron nitride, oxygen generated by the decomposition of pyrophyllite during the conduct of the process is able to reach the reaction volume through the intervening cell parts. However, it has been found that improved control of the process for preparing cubic boron nitride crystals may be achieved by the controllable introduction of an oxygen source within the reaction mixture in the form of a decomposable oxide.

Positive control over the amount of oxygen available in the reaction zone is highly desirable and this is best accomplished by:

(a) Utilizing cell parts and powdered mixtures substantially free of adsorbed and chemically bound water and entrapped air, (b) Utilizing shielding means for the reaction zone as is described in U.S. Patent No. 3,407,445—Strong (incorporated by reference), whereby the reaction mass is isolated from the reaction vessel parts radially disposed therearound by an enclosure (e.g. a metal cylinder in cooperation with an upper and a lower metal disc) made of an efficient oxygen getter metal, such as titanium and (c) Introducing an internal oxygen supply as part of the reaction mixture.

In this way, the amount of oxygen in the reaction mixture may preferably be controllably set between about 5 atom percent oxygen and about 15 atom percent oxygen. The usable range of oxygen appears to be about 1–20 atom percent with the minimum amount of oxygen being that amount required to drive the cubic boron nitride-forming reaction to the production of lithium boroate liquid (which quenches to a glass):

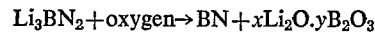
$$Li_3BN_2 + oxygen \rightarrow BN + xLi_2O.yB_2O_3$$

(a lithium borate liquid), where *x* and *y* are not definable at present.

Figure 2:
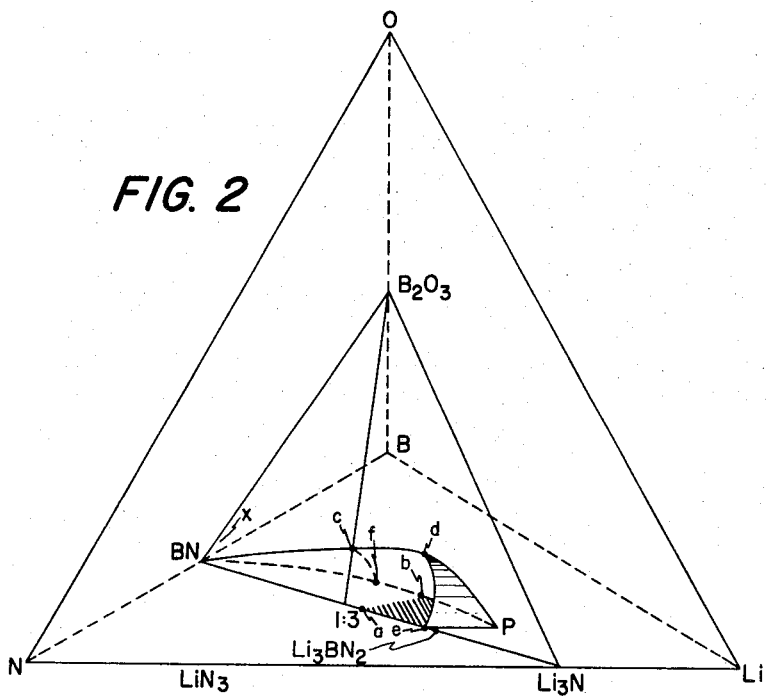

The amount of oxygen to be provided for any given Li—B—N composition employed may be approximated from the three-dimensional cubic boron nitride stability zone shown in FIG. 2. This volume ranges from the plane $Li_3N$—BN—$B_2O_3$ (where it is shown as the trace BN-*c-d-e*) to the base plane Li—B—N (where it is shown as the trace BN-*a-e*-P-*b-f-x*). As may be seen in comparing FIGS. 1 and 2, Li—B—N compositions in the shaded region (*a, b,* P, *e, a*) located roughly midway between *a–b* and *e–p* will require amounts of oxygen at about the preferred maximum, 15 atom percent. Compositions of Li—B—N in the shaded region that are located closer to *e*-P will require amounts of oxygen closer to the preferred minimum, 5 atom percent.

Amounts of oxygen less than 5 atom percent may be added particularly to cause localized nucleation and growth and amounts of oxygen greater than 15 atom percent may be used in runs of short duration.

The additive according to this invention should either be boron oxide or a boron source plus a decomposable metal oxide. The preferred metal oxides are those materials having the ability either to be easily reduced or to form another compound such as a boride or a nitride. The preferred decomposable oxides are titanium oxides, zirconium oxide, lanthanum oxide, europium oxide, molybdenum oxides, cerium oxides, tantalum oxide and tungsten oxides. Very good decomposable oxides for the practice of this invention are manganese oxides, germanium oxide, lead oxides, chromium oxides, magnesium oxide, tin oxides and bismuth oxide. Other oxides, which have produced cubic boron nitride in titanium-shielded cells in smaller yields than in the case of the aforementioned decomposable metal oxides are silicon oxide, aluminum oxide, and vanadium oxides.

An important aspect of this invention lies in the capability offered thereby for utilizing the compound $Li_3BN_2$ as a prime constituent for the synthesis of cubic boron nitride. Because of its high density (about 1.8 gm./cc.) as compared to the density of $Li_3N$ (1.38 gm./cc.) a higher initial packing density may be achieved in the reaction vessel. In the absence of either boron oxide or a boron source plus a decomposable metal oxide, cubic boron nitride, however, will not form from $Li_3BN_2$. In the process the initial (one atmosphere) form of $Li_3BN_2$ is converted to the high pressure form thereof, which by itself does not release the boron and nitrogen atoms entrapped therein to enable the formation of cubic boron nitride when cubic boron nitride-stable temperatures and pressures are reached.

The one atmosphere form of $Li_3BN_2$ is prepared by the reaction of $Li_3N+BN$ in a molybdenum crucible in nitrogen at one atmosphere. [J. Goubeau and W. Anselment, Z. anorg. Chem., 310, 249–260 (1961)]. Manifestly, an even higher initial packing density could be employed utilizing the high pressure form of $Li_3BN_2$, but the conditions required for preparation thereof (about 700° C. at 20 kilobars) are not economically feasible at the present.

Example 1

A mixture of 50 mole percent $Li_3BN_2+20$ mole percent $MgO+30$ mole percent boron was reacted in a titanium-lined high pressure cell at 55 kb. and 1690° C. for 15 minutes and cubic boron nitride crystals of maximum diameter of 0.18 mm. were produced.

Example 2

A mixture of 50 mole percent $Li_3BN_2+20$ mole percent $TiO_2+30$ mole percent B was reacted in a Ti-lined high pressure cell at 55 kb. and 1625° C. for 15 minutes and cubic boron nitride crystals with a maximum diameter of 0.14 mm. were produced. The crystals tended to be platelike.

Example 3

A mixture of 55.6 mole percent $Li_3BN_2+11.1$ mole percent $V_2O_5+33.3$ mole percent B was reacted in a Ti-lined high pressure cell at 55 kb. and 1625° C. for 15 minutes, and cubic boron nitride crystals were produced. The maximum grain size was 0.08 mm.

Example 4

A mixture of 50 mole percent $Li_3BN_2+20$ mole percent $SnO+30$ mole percent B was reacted in a Ti-ined high pressure cell at 55 kb. and 1625° C. for 15 minutes and fine grained cubic boron nitride crystals formed.

Example 5

A mixture of 50 mole percent $Li_3BN_2+20$ mole percent $MoO_3+30$ mole percent B was reacted in a Ti-lined high pressure cell at 55 kb. and 1625° C. for 15 minutes and a high yield of fine grain truncated tetrahedral crystals of cubic boron nitride about 0.01 mm. in diameter were produced.

Example 6

A mixture of 50 mole percent $Li_3BN_2+20$ mole percent $WO_3+30$ mole percent B was reacted in a Ti-lined high pressure cell at 55 kb. and 1625° C. for 15 minutes and a high yield of rounded and truncated tetrahedral crystals of cubic boron nitride as large as 0.02 mm. were produced.

Example 7

A mixture of 50 mole percent $Li_3BN_2+20$ mole percent $PbO_2+30$ mole percent B was reacted in a Ti-lined high pressure cell at 55 kb. and 1625° C. for 15 minutes and some tetrahedral crystals of cubic boron nitride were produced.

Example 8

A mixture of 50 mole percent $Li_3BN_2+20$ mole percent $CrO_3+30$ mole percent B was reacted in a Ti-lined high pressure cell at 55 kb. and 1625° C. for 15 minutes and both tetrahedral and irregularly shaped crystals were produced.

Example 9

A mixture of 50 mole percent $Li_3BN_2+20$ mole percent $SiO_2+30$ mole percent B was reacted in a Ti-lined high pressure cell at 55 kb. and 1625° C. and a trace of cubic boron nitride crystals were produced.

Example 10

A mixture of 50 mole percent $Li_3BN_2+20$ mole percent $ZrO_2+30$ mole percent B was reacted at 55 kb. and 1625° C. for 15 minutes in a Ti-lined high pressure cell for 15 minutes and a good yield of tetrahedral shaped cubic boron nitride crystals were produced. The maximum grain size was about 0.10 mm.

Example 11

A mixture of 50 mole percent $Li_3BN_2+20$ mole percent $MnO_2+30$ mole percent B was reacted at 55 kb. and 1625° C. for 15 minutes in a Ti-lined high pressure cell and a good yield of angular, nonequant, twinned crystals of cubic boron nitride was produced. The maximum grain size was about 0.14 mm.

Example 12

A mixture of 55.6 mole percent $Li_3BN_2+11.1$ mole percent $Al_2O_3+33.3$ mole percent B was reacted at 55 kb. and 1625° C. for 15 minutes in a Ti-lined high pressure cell and a few cubic boron nitride crystals—primarily as plates—were produced.

Example 13

A mixture of 55.6 mole percent $Li_3BN_2+11.1$ mole percent $La_2O_3+33.3$ mole percent B was reacted at 55 kb. and 1625° C. for 15 minutes in a Ti-lined high pressure cell and plate-like cubic boron nitride crystals were produced.

Example 14

A mixture of 55.6 mole percent $Li_3BN_2+11.1$ mole percent $Eu_2O_3+33.3$ mole percent B was reacted at 55 kb. and 1625° C. for 15 minutes in a Ti-lined high pressure cell and cubic boron nitride crystals were produced.

Example 15

A mixture of 50 mole percent $Li_3BN_2+20$ mole percent $GeO_2+30$ mole percent B was reacted at 55 kb. and 1625° C. for 15 minutes in a Ti-lined high pressure cell and both tetrahedral and irregular shaped crystals of cubic boron nitride were produced.

Example 16

A mixture of 50 mole percent $Li_3BN_2+20$ mole percent $CeO_2+30$ mole percent B was reacted at 55 kb. and 1625° C. for 15 minutes in a Ti-lined high pressure cell and cubic boron nitride crystals of maximum size of about 0.15 mm. were produced.

Example 17

A mixture of 80 mole percent $Li_3BN_2$ and 20 mole percent $TiO_2$ but without any boron addition was reacted at 55 kb. and 1625° C. for 15 minutes in a Ti-lined high pressure cell and *no* cubic boron nitride was produced.

Example 18

Li$_3$BN$_2$ was packed into a platinum tube and run at 52 kb. and 1725° C. for 15 minutes in a high pressure cell in order to see if the reaction between Li and Pt would serve as a chemical sink for Li and result in the growth of cubic boron nitride. No cubic boron nitride formed.

What we claim as new and desire to secure by Letters Patent of the United States is:

1. In the method of making cubic boron nitride crystals wherein high pressures and high temperatures are simultaneously applied in a high pressure, high temperature apparatus to a lithium-boron-nitrogen reaction mass in which the lithium content is in excess of about 30 atom percent, wherein the reaction mass is shielded from the reaction vessel parts radially disposed therearound by a barrier of an efficient oxygen getter metal, the improvement of including in said reaction mass a quantity of material selected from the group consisting of (a) boron oxide and (b) a boron source plus at least one decomposable metal oxide, said quantity of material being sufficient to supply oxygen to said reaction mass in the range of from about 1 to about 20 atom percent.

2. The improvement of claim 1 wherein the quantity of material is sufficient to supply oxygen in the range of from about 5 to about 15 atom percent.

3. The improvement of claim 1 wherein metal oxide is selected from the group consisting of titanium oxides, zirconium oxide, lanthanum oxide, europium oxide, molybdenum oxides, cerium oxides, tantalum oxide and tungsten oxides.

4. The improvement of claim 1 wherein metal oxide is selected from the group consisting of manganese oxides, germanium oxide, lead oxides, chromium oxides, magnesium oxide, tin oxides and bismuth oxide.

5. The improvement of claim 1 wherein metal oxide is selected from the group consisting of silicon oxide, aluminum oxide and vanadium oxides.

6. The improvement of claim 1 wherein the reaction mass contains the one atmosphere form of Li$_3$BN$_2$.

7. The improvement of claim 1 wherein the shielding metal is titanium.

References Cited

UNITED STATES PATENTS

| | | | |
|---|---|---|---|
| 2,947,617 | 8/1960 | Wentorf, Jr. | 23—191 X |
| 3,192,015 | 6/1965 | Wentorf, Jr. | 23—191 |

OTHER REFERENCES

De Vries et al.: Chem Abs., para. 33949 k, vol. 71 (1969).

OSCAR R. VERTIZ, Primary Examiner